United States Patent [19]
Ritter

[11] Patent Number: 4,577,410
[45] Date of Patent: Mar. 25, 1986

[54] METHOD AND APPARATUS FOR PROVIDING ACCURATE WIRELINE DEPTH MEASUREMENTS

[75] Inventor: Thomas E. Ritter, Katy, Tex.

[73] Assignee: Halliburton Company, Duncan, Okla.

[21] Appl. No.: 743,447

[22] Filed: Jun. 11, 1985

[51] Int. Cl.[4] ............................................. G01B 5/04
[52] U.S. Cl. .................................. 33/129; 33/141 R
[58] Field of Search ................... 33/129, 127, 132 R, 33/133, 134 R, 141 R, 141 E

[56] References Cited

U.S. PATENT DOCUMENTS

| | | | |
|---|---|---|---|
| 2,876,549 | 3/1959 | Adamson et al. | 33/129 |
| 4,205,447 | 6/1980 | Smith | 33/129 |
| 4,338,565 | 7/1982 | Hall | 33/127 |
| 4,481,714 | 11/1984 | Nelson | 33/129 |

Primary Examiner—Willis Little
Attorney, Agent, or Firm—W. J. Beard

[57] ABSTRACT

For use with a wireline supporting a tool in a well borehole, length measuring apparatus is disclosed. In the preferred form, the length measuring apparatus comprises a housing around the wireline locus, rollers clamping the wireline, and helix following wheels. The wheels track the helix of the wireline around the wireline, rotating on a bearing assembly, and driving a chain. The chain drives an encoder to record length of the wireline in the well borehole.

12 Claims, 4 Drawing Figures

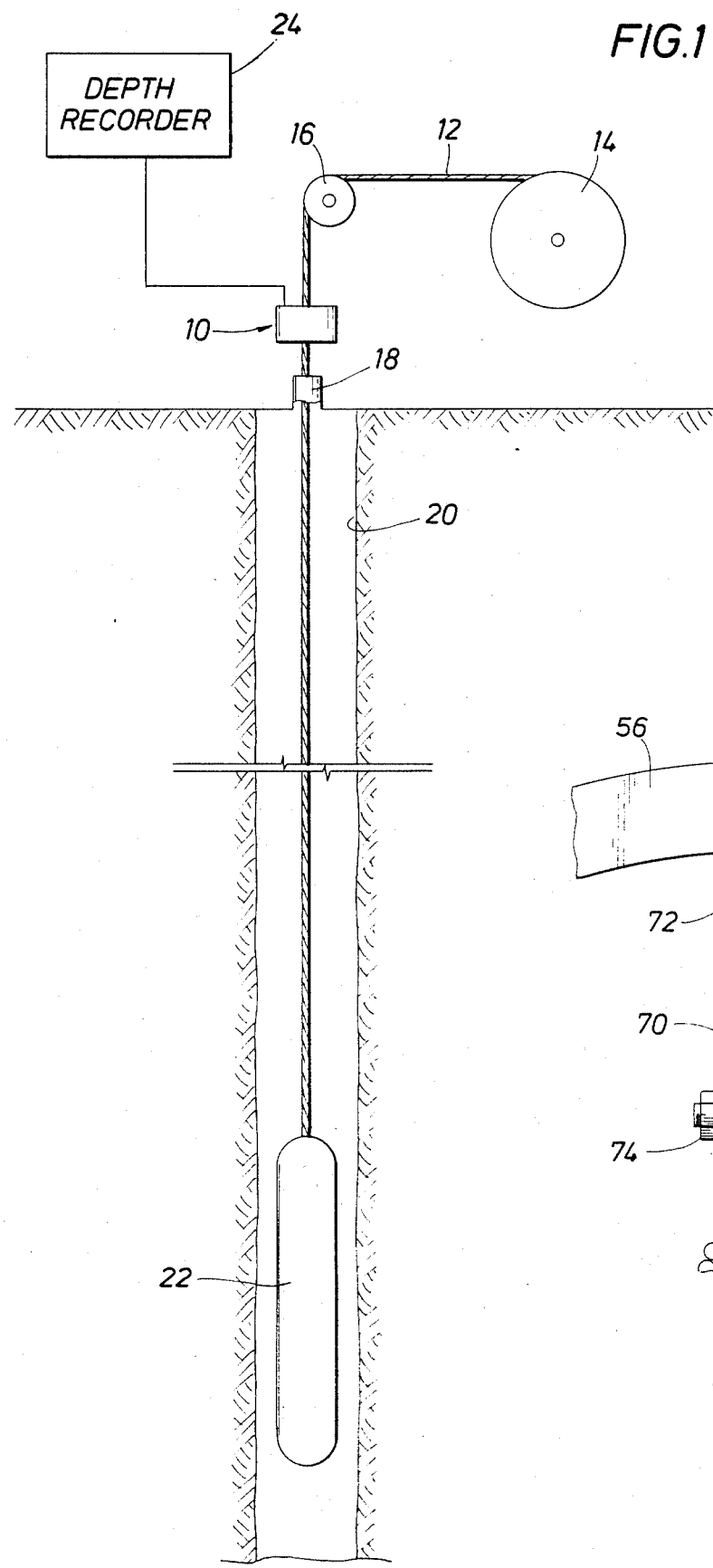
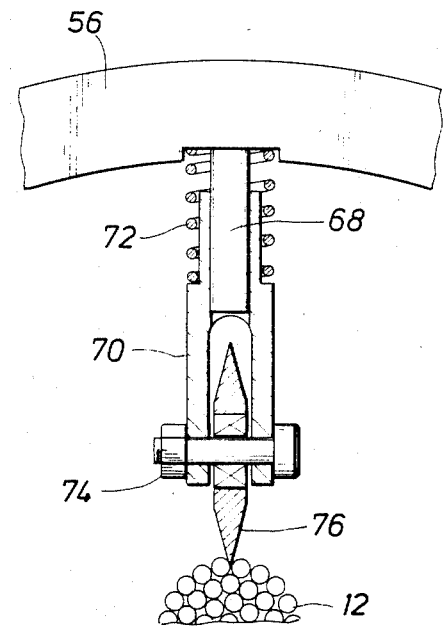
FIG. 1
FIG. 4

METHOD AND APPARATUS FOR PROVIDING ACCURATE WIRELINE DEPTH MEASUREMENTS

BACKGROUND OF THE DISCLOSURE

During drilling of a well, completion thereof, and subsequent remedial services conducted after the well has been placed in service, all procedures may require use of tools lowered on wirelines. A wireline is defined for purposes of this disclosure as a woven or wrapped, multistrand wire wherein the strands have a lay or lay distance to thereby define externally observable helixes between adjacent strands. In well logging, the wireline comprises externally armored electrical cable having a plurality of insulated inner conductors. The well logging tools which are typically lowered on a wireline are ordinarily lowered to specified depths. Different tools may be required to be lowered in multiple operations to the same or different depths wherein the depth measurements must be accurate and repeatable for multiple operations to be conducted. For instance, assume as an example that a hydrocarbon producing sand has been located that is 20 ft. thick and is located at a depth of 20,000 ft. It will be understood that a one percent (1.0%) error in the measurement of the position of a wireline supported tool represents an error of 200 ft. at that depth, an error which is ten times greater than the thickness of the producing formation of interest. Clearly, it is necessary that accurate repeatable wireline depth measurements be made so that the multiple steps in servicing the well can be carried out accurately.

A similar requirement may exist in conducting different operations by a single tool at multiple depths. For instance, a logging tool may be used to record multiple formations as the tool is retrieved from a depth of 20,000 ft. Some of the formations may be only a few feet in thickness and hence, it is important that the depth measurements of the tool as it traverses the well borehole by accurate so that all the measurements and hence all the observed formations can be accurately located relative to well depth.

Examples of depth measuring equipment used in the past and representative of the prior art, include the placement of magnetic marks on the wireline at specified intervals along the length. It is necessary to accurately control tension of the wireline while marking the line since to insure that the magnetic marks are properly spaced. Errors in measurement may arise from variations in tension while marking the wireline. In making measurements with a wireline having marks at 100 foot intervals, some additional type of measuring device is also required to cover the possibility that measurement to an intermediate point (other than multiples of 100 ft.) might be accomplished. This additional measuring device is susceptible to erronous measurement. Moreover, magnetic marking of a wireline requires a calibrated measurement instrument to provide accurate measurement. In making depth measurements, tension variations require correction in relation to the measured tension versus calibration tension. Another type of arrangement of measuring device is an incremental encoder driven by a sheave which provides pulses as the sheave is rotated when the wireline passes over the sheave. Thus, sheave rotation is assumed to be proportional to wireline length. Errors in measurement can arise from wireline-to-sheave slippage of the marked 100 foot increments which could produce further error. In this type of system, one presumes that the sheave does not slip and maintains an accurate and controllable circumference. But, slippage is possible. Also, mud or ice (in cold environment) can accumulate and build up on the wireline and hence change the diameter of the wireline or the sheave or both. Errors arising from tension measurement translate into depth measurement errors. The present apparatus provides a positive wireline engaging mechanism which thereby yields improved depth measurements. The wireline is typically constructed with a central core which may include insulated conductor wires. It is typically formed with multiple armor strands wrapped around the exterior to form a surrounding sheath defined by strands laid against one another in helix form. The pitch of the wireline is determined in part by the diameter, number of strands, and the tightness of the twist. Wirelines are typically described in terms of diameter, pitch and number of strands. Such a wireline is measured by the method and apparatus of the present invention. This apparatus and method have advantages over the prior art. Included among examples of the prior art are U.S. Pat. Nos. 3,520,062 and also, 4,179,817. The present apparatus positively follows the wireline as it passes into the borehole, tracking the wireline by following the helix on the exterior. This imparts rotation to a helix follower having the form of a wheel with a relatively sharp edge inserted into the helix for following the helix. As the wireline passes through the equipment, and as the revolution of the helix pass the equipment, the revolutions are noted by forcing the helix follower to rotate about the wireline. The follower is supported on a transverse bearing system. As it rotates, it drives a chain or toothed belt engaging a sprocket with an electrical encoder forming an output signal proportional to revolutions of the helix follower. Suitable guide rollers supported by a mounting means complete the system so that it can be positioned at the wellhead or on a logging truck in near proximity to the wireline which is lowered into the well to support a tool.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 1 is a schematic view showing a wireline extending into a well borehole suspending a tool thereon and wherein the wireline length measuring apparatus of this disclosure is installed near the wellhead;

FIG. 4 is a detailed view of a helix tracking mechanism.

DETAILED DESCRIPTION OF THE PREFERRED EMBODIMENT

Figure 2:
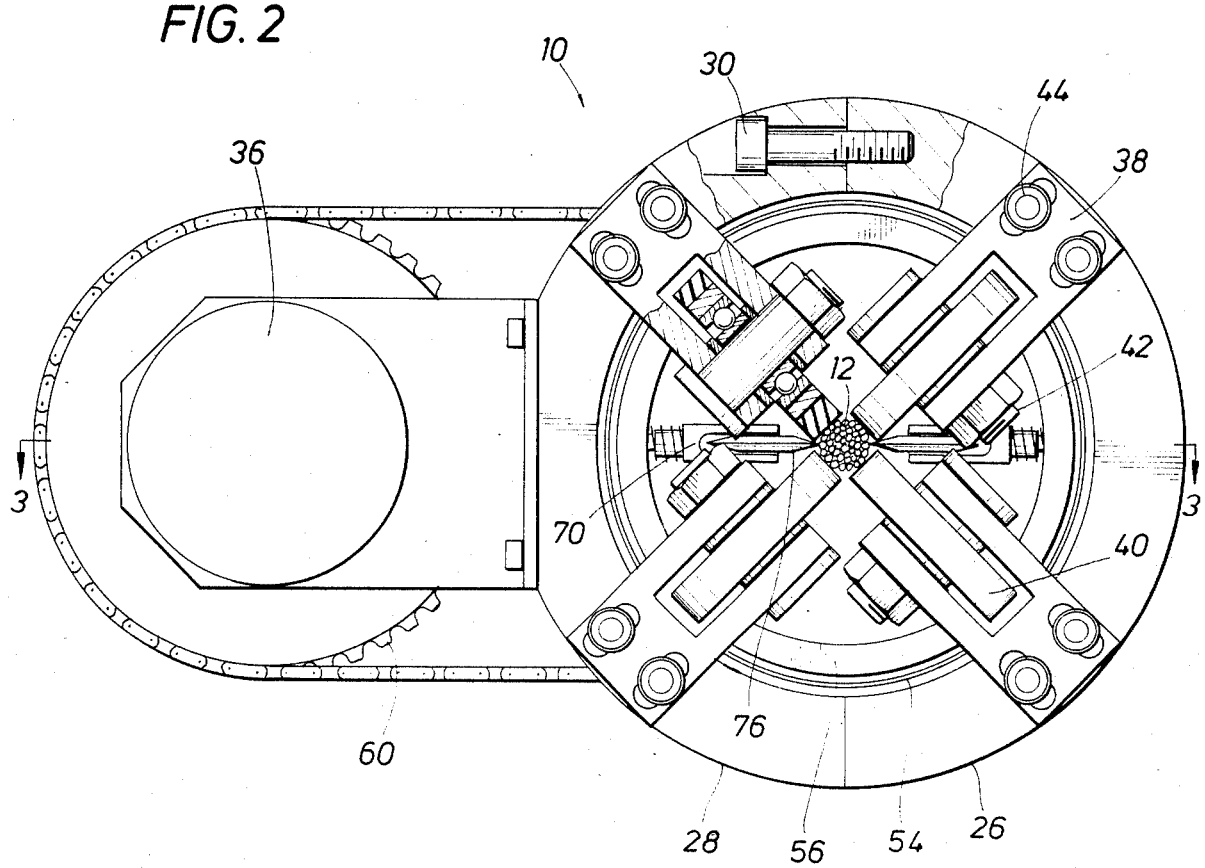
FIG. 2 is an end view of the present apparatus showing the wireline passing through the center thereof and wherein guide rollers position the wireline to be followed by helix following means.

Attention is directed to FIG. 1 of the drawings. There, the wireline length measuring apparatus of the present invention is identified generally by the numeral 10. It is positioned schematically relative to a wireline 12 which is supplied from a suitable drum 14. The wireline is fed over a sheave 16 into a lubricator 18. The lubricator enables the wireline to enter, against pressure as the case may be, into the borehole 20. The wireline supports a suitable well logging tool 22 at the lower end. The well borehole 20 may be open hole or cased. There may be a casing and various production tubing strings located in the well which have been omitted for sake of clarity. Moreover, the tool 22 can have any structure, and may include test or operating equipment of a wide variety. The tool 22 has a normally fixed weight which is supported on the wireline 12 wherein a particular size of wireline is selected for a particular weight of tool. As required, sinker bars may be added to the tool 22 to obtain a specified weight on the wireline.

The wireline 12 may be quite long, perhaps even 33,000 ft. in length. It is made of multiple armor strands wrapped in a helix about a central core. This defines an external helix between adjacent strands; indeed, the number of strands will define the number of helical turns along the exterior cylindrical surface of the wireline 12.

The wireline is presumed to be under a linearly changing tension. The tension is determined primarily by the weight of the tool 22 added to the weight of cable length in the well. It is desirable that the tension resulting from the supported weight by fairly constant so that variations in elongation from the tool weight do not occur. Thus, the tension resulting from the tool weight on the wireline observed by the measuring equipment 10 is normally fairly constant for a given use or installation. This may vary with other wells, depending on whether or not the weight of the tool 22 is changed. This particularly relates in part to possible elongation of the wireline. Under the assumption the wireline is used with a known or calibrated measure of tension resulting from known weight thereon, the possibility of elongation is substantially a known and controllable factor.

The tension is corrected according to stretch coefficient of the wireline (in/in/lb) which is a determined constant. The wireline depth increases as a function of cable length in the well. This is dependent on the slope of the plot of tension versus length of wireline in the well for a selected wireline size. Thus, tension is given by the relationship K (tool weight+BL), where B is weight per unit length, L is length of wireline in the well and K is a constant. Tool weight and BL are determined in common units. The correction factor is needed due to the change in lay distance resulting from cable stretch, or stretching of the helix observed on the wireline. The present apparatus cooperates with the wireline typically at an exposed location near the wellhead. It can operate on the wireline where the wire is vertical just before it extends into the lubricator 18. Alternatively, the present apparatus 10 can be located between the sheave 16 and the supply drum 18 where the wireline is horizontal. In either case, the apparatus is located at a convenient location and forms an output signal supplied to a depth recorder 24. This assures that the location or depth of the tool 22 is recorded with accuracy. The depth measuring apparatus 10 tracking in the helix of the wireline 12 provides an output signal to the depth recorder which is proportional to depth of the tool 22 in the well 20.

In FIG. 2 of the drawings, a split cylindrical housing is illustrated. One portion is identified by the numeral 26 while the opposite half is identified by the numeral 28. The two portions are bolted together by suitable bolts at 30. They form a cylinder about the wireline 12 which is the center line of the cylindrical wireline 12 which is the center line of the cylindrical housing. A flat face 32 is formed on the side of the cylindrical housing to support a mounting bracket 34. The bracket 34 protrudes to the side to support an encoder 36 which converts rotation into electrical pulses. A suitable scale factor is determined for the apparatus as, for instance, the representation of one rotation by 360 pulses. The scale factor can be varied over a relatively wide range. The cylindrical housing supports an inwardly directed mounting arm 38 at the top end. The arm 38 is bifurcated from the inmost end to define a slot to enable the arm 38 to support a guide roller or wheel 40. The wheel 40 is supported on a suitable shaft 42 which is fastened in place by a nut on the threaded end. The nut in conjunction with the head on the opposite end (see FIG. 2) defines a shaft or axle for the wheel 42. The wheel is permitted to free-wheel, and is preferably constructed out of metal with a resilient coating around the periphery to engage the wireline 12. This serves to obtain positive engagement. More conveniently and as shown in FIG. 2, the wheel incorporates a suitable sealed bearing assembly so that it is able to rotate substantially free of drag or friction.

Figure 3:
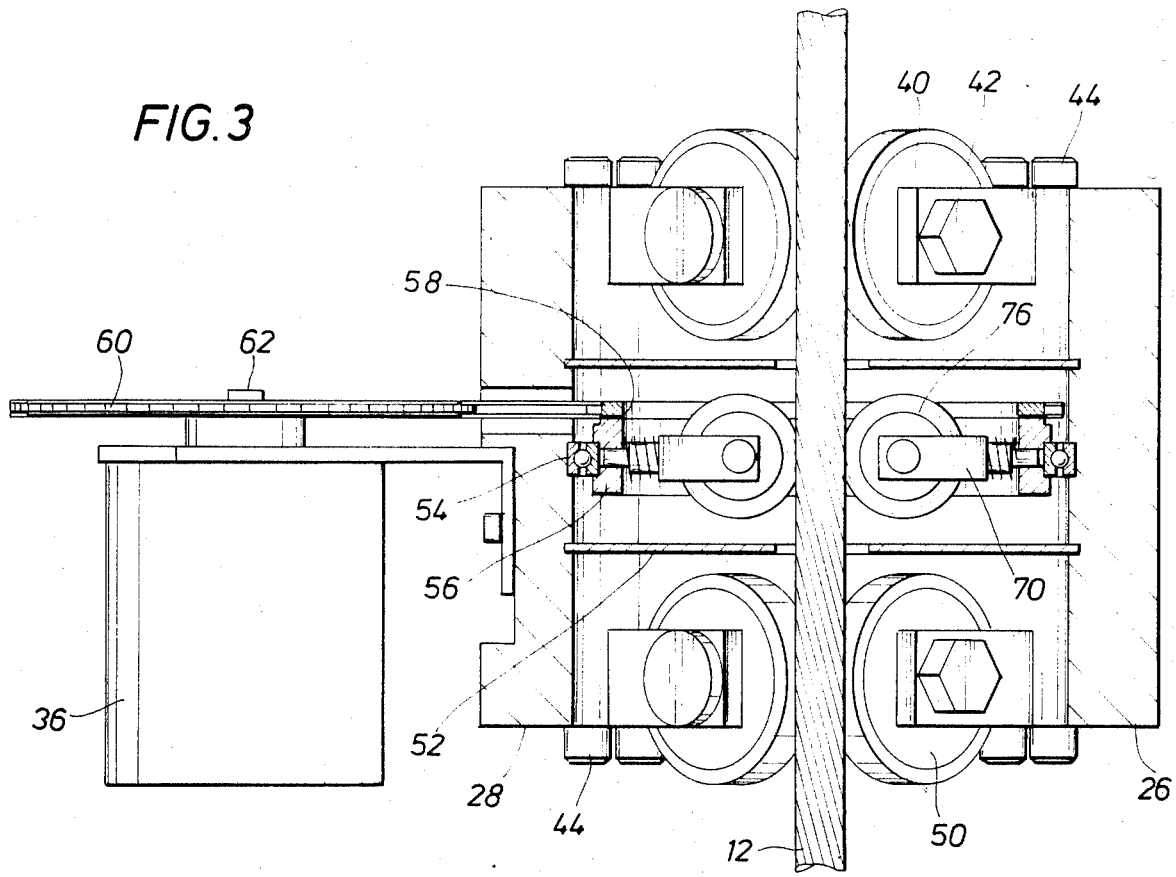
FIG. 3 is an orthagonal relative to FIG. 2 in section through the wireline showing internal details and construction of the apparatus.

As shown in FIG. 2, the arm 38 is duplicated at four locations spaced every 90°. Thus, four wheels are brought to bear against the wireline 12. They collectively pinch the wireline, clamping it for free linear movement, but preventing lateral deflection of the wireline. The four collectively free-wheel and enable the wireline to be pulled upwardly or downwardly centered by past the four guide rollers. As will be observed in the drawings, the wireline 12 is substantially caught in the center line of the equipment. Similar mounting equipment is used for the four respective mounting arms. That is, they are held in position by means of suitable fastening housing previously mentioned. FIGS. 2 and 3 are related to one another as orthogonal views. The guide rollers described above form an upper guide roller system. There is a lower guide roller system also and the rollers there are identified by the numeral 50. The numeral 50 refers to identical equipment but it is different in that it is located below the upper guide rollers. It comprises again four rollers, the two sets of rollers being spaced apart by several inches so that they clamp the wireline 12 and thereby align the wireline with the center of the housing.

As will be observed, the wireline may vary in diameter from use to use, and to this end, the several rollers can move radially inwardly and outwardly. In FIG. 2 of the drawings, the mounting bolts 44 fasten the mounting arms 38 which can slide radially inwardly or outwardly by taking advantage of elongate slots for the bolts 44. This accommodates adjustment as a result of variations in wireline diameter. A fixture is used to assure accurate alignment.

Two flat disk like circular shields 52 are located on the center of the housing and protrude inwardly to serve as a type of splashguard. They surround and encompass a very large bearing assembly 54. The bearing assembly 54 includes a fixed outer race and a moveable inner race. It is anchored in an internal groove formed in the housing and is positioned at that location prior to assembly of the housing from two portions 26 and 28. This bearing assembly supports a ring 56, the ring 56 having an edge located sprocket 58. The sprocket 58 aligns with a parallel, spaced apart driven sprocket 60. The sprocket 60 is mounted on the shaft 62 of the encoder 36. The sprocket 58 drives a sprocket chain (omitted for sake of clarity) which engages the driven sprocket 62 for the purpose of imparting rotation to the driven sprocket. The two sprocket arrangement utilizes a chain or cogged drive belt which is pulled taut. The chain passes through the shell or housing member 26 at suitable locations and, to this end, the housing is slotted to allow assembly and passage of the chain. The slotted opening has a suitable width to enable the chain to pass therethrough to enable guidance of the chain as it runs between the sprockets 58 and 60. The chain and sprocket drive system constitutes a positive engagement arrangement.

The ring 56 supports a radially inwardly directed mounting pin 68. The pin 68 is fixed to the ring 56. It supports on the free end a telescoping sleeve having a pair of protruding struts at 70. The sleeve slides over the end of the pin 68; a coil spring 72 is positioned around the pin 68 and forces the struts 70 radially toward the wireline 12 as better shown in FIG. 4. The two struts together define a gap therebetween and support a suitable shaft 74, the shaft 74 serving as the axle for a freely rotating helix engaging wheel 76. The number of wheels 76 can be varied. The wheel 76 is relatively small compared to the guide rollers 40 and 50; moreover, it defines an outer edge which is relatively sharp. The outer edge is sharp, cut to an angle to enable the edge of the wheel 76 to fit into the helix defined on the exterior of the wrapped wireline 12. The included angle and relative sharpness of the wheel can be varied to accommodate the wireline size. Thus, variations in wireline may be accompanied by variations in wireline size and to this end, the wheel may be modified somewhat to accommodate such variations. As a general principle, the wheel is relatively sharp but not sufficiently sharp that it is described as a cutting edge. Moreover, the edge is relatively thin and is able to track in the helix formed by adjacent wires on the wireline outer surface.

The spring 72 enables the wheel to ride up and down slightly. Even so, the present apparatus contemplates the use of a pair of opposed helix tracking wheels as best shown in FIGS. 2 and 3. Because both are spring loaded and both are urged towards the wireline 12, they move towards it and tend to clamp against it. The wheel strut is free to rotate on the shaft 68 which enables the tracking wheel to adjust to the helix angle of the wireline. To simplify the view of the wheel, the wheel is shown in a straight ahead position; in use, the wheel is rotated to conform to the helix angle of the wireline. When the wireline moves through the apparatus, the twin helix tracking wheels to follow the helix and hence rotate about their respective shafts 74. Moreover, the wheels impart rotation to the ring 56. Recall that the ring 56 is mounted on a bearing system so that very little force is required to rotate the ring 56. Such tracking is accompanied by rotation of the sprocket 56 which in turn drives the sprocket 60. The sprocket 60, of course, drives the encoder 36 to form output pulses which are proportional to rotation which is proportional to cable length. Assume as an example that 100 ft. of the cable is accompanied by 400 helical revolutions. That is, one full helical turn on the outer surface of the wireline requires 0.25 ft. and hence 400 full turns will describe 100 ft. of the wireline. Assuming these scale values, and further assuming that the encoder provides one pulse for each degree of rotation, then 100 ft. of wireline cable would be represented by 400×360 pulses and the 100 ft. length of wireline would be represented by 144,000 pulses. As observed, this is a scale value which can be varied depending on the needs and requirements of the particular system.

From the foregoing, it will be concluded that the method of the present disclosure contemplates the measurement of wireline extended into the borehole 20 wherein the helix engaging and tracking wheels follow the helix as it moves past the elevation where the wheels are located. Since that is a fixed location relative to the moving wireline, length of wireline can be determined by rotation (whole turns as well as fractions thereof) of the following apparatus. In a given situation, it is preferable to calibrate the equipment relative to a particular wireline. To this end, for a given wireline, it is necessary to determine the stretch coefficient needed to correct the depth measurement according to tension in the wireline.

While the foregoing is directed to the preferred embodiment, the scope thereof is determined by the claims which follow.

What is claimed is:

1. For use with tools lowered into a well borehole on a wireline having multiple strands wrapped into a running helix and where the wireline passes over a sheave above the borehole and into the borehole to support a tool at depths limited by the depth of the well and wherein the tool is subject to be raised or lowered in the well, apparatus for measuring the length of wireline in the borehole which apparatus comprises:
    (a) wellhead mounting means positioned adjacent to the locus of the wireline supporting a tool in the well borehole;
    (b) wireline guide means positioning the wireline along a specified path relative to said mounting means, said guide means cooperatively securing the wireline in a taut path in conjunction with the weight of a tool suspended in the borehole by the wireline;
    (c) helix follower means engaging a helix defined by the multiple strands of the wireline, said means moving in circular movement as the helix moves therepast and wherein said means follows said helix for multiple revolutions dependent on wireline movement therepast; and
    (d) signal forming means connected to said follower means for forming a signal proportional to revolutions of said follower means as the helix moves therepast, said signal forming means forming the signal dynamically as the helix moves therepast.

2. The apparatus of claim 1 wherein said wellhead mounting means includes a cylindrical housing adapted to be positioned about the locus of the wireline which coincides with the center line of said housing.

3. The apparatus of claim 1 wherein said wellhead mounting means includes a structure fixed above the well borehole and below a sheave engaging the wireline extended through said wellhead mounting means.

4. The apparatus of claim 1 wherein said wireline guide means includes at least a pair of opposed, free-wheeling resilient surface, rollers directed radially inwardly toward the path of the wireline for clamping the wireline to position the wireline centrally of said wellhead mounting means.

5. The apparatus of claim 1 wherein said wireline guide means includes at least four freely rotating axle mounting wheels, said wheels positioned at 90° angles relative to one another about the wireline, said wheels all having an outer periphery which collectively capture the wireline along the specified path and wherein said wheels are free to rotate, positively clamping the wireline therebetween to guide the wireline along the specified path.

6. The apparatus of claim 5 including a second set of four similar wheels, said first and second sets being spaced apart along the wireline on opposite sides of said helix follower means.

7. The apparatus of claim 1 wherein said helix follower means includes a rotatable wheel having an outer edge profiled to fit within the helix on the wireline and further wherein said wheel is resiliently urged into engagement with the wireline.

8. The apparatus of claim 7 including a surrounding ring positioned about the relative path of the wireline, said ring supporting said helix follower means, bearing means supporting said ring means, and wherein said helix follower means is forced against the wireline and tracks a particular helix on the exterior of the wireline and rotates thereabout with linear movement of the wireline.

9. The apparatus of claim 8 further including a drive mechanism connected from said ring to said signal forming means to impart rotation thereto and wherein said signal forming means is constructed and arranged to provide an output signal proportionate to rotation of said ring.

10. The apparatus of claim 9 wherein said drive mechanism includes cooperatively engaged first and second gear means.

11. The apparatus of claim 10 wherein said gear means are synchronously rotated.

12. A method of determining the length of a wireline lowered into a well borehole wherein:

the wireline is constructed of multiple strands wrapped into a running helix along the length thereof, and further:

wherein the wireline is aligned with the well borehole and extends into the borehole to support a tool therein for conducting downhole well operations, the method comprising the steps of positioning a helix tracking means adjacent to and positioned against the wireline proximate to the wellhead;

(a) imparting rotation to said helix tracking means by linear movement of the wireline into or out of the the well borehole;

(b) wherein said rotation is proportional to linear translation of the helix moving therepast and causing a proportional relationship therebetween; and (c) converting the rotation into a signal which is proportionate to rotation wherein the signal encodes a length of wireline moving past said helix tracking means into or out of the well borehole.

* * * * *